United States Patent [19]

Allen

[11] Patent Number: 5,738,055
[45] Date of Patent: Apr. 14, 1998

[54] ADJUSTABLE CAMSHAFT TIMING DEVICE

[75] Inventor: Timothy R. Allen, Paris, Ark.

[73] Assignee: Cloyes Gear and Products, Inc., Mentor, Ohio

[21] Appl. No.: 831,390

[22] Filed: Apr. 1, 1997

Related U.S. Application Data

[60] Provisional application No. 60/029,596, Oct. 23, 1996.

[51] Int. Cl.$^6$ .................... F01L 1/34; F16H 35/06; F16H 53/04
[52] U.S. Cl. .................... 123/90.17; 123/90.31; 123/90.15; 74/395; 74/568 R; 464/160; 474/900; 474/903
[58] Field of Search .................... 123/90.15, 90.17, 123/90.31, 90.6; 74/567, 568 R, 395, 397; 464/160; 474/900, 903

[56] References Cited

U.S. PATENT DOCUMENTS

| | | | |
|---|---|---|---|
| 3,415,137 | 12/1968 | Casale | 74/395 |
| 3,501,973 | 3/1970 | Casale | 74/395 |
| 3,734,073 | 5/1973 | Walter et al. | 123/90.15 |
| 4,096,836 | 6/1978 | Kopich | 123/90.15 |
| 4,177,773 | 12/1979 | Cribbs | 123/90.15 |
| 4,553,652 | 11/1985 | Fallos | 474/900 |
| 4,955,330 | 9/1990 | Fabi et al. | 123/90.17 |
| 5,152,263 | 10/1992 | Danieli | 123/90.17 |
| 5,174,169 | 12/1992 | Allen | 74/395 |
| 5,181,432 | 1/1993 | Allen | 74/395 |
| 5,417,611 | 5/1995 | Mitchell | 74/568 R |
| 5,495,776 | 3/1996 | Allen | 74/395 |

Primary Examiner—Weilun Lo
Attorney, Agent, or Firm—Fay, Sharpe, Beall Fagan, Minnich & McKee

[57] ABSTRACT

Apparatus especially useful in internal combustion engines for adjusting the timing and including a shaft having a longitudinal axis and mounted for rotation about said axis with a circular drive member carried by the shaft. An adjustable key assembly is located between the shaft and the drive member for conducting drive forces therebetween while permitting selective relative angular adjustment. The adjustable key assembly includes a key member having a first end pivotally engaged with one of the shaft and drive member and a second end slidably engaged with the other of the shaft and drive member. The second end of the key member and the other of the shaft and drive member include cooperating inclined surfaces for producing relative angular movement between the shaft and the drive member when the key member is selectively pivoted about the first end.

16 Claims, 4 Drawing Sheets

ADJUSTABLE CAMSHAFT TIMING DEVICE

This application claims priority from U.S. provisional application No. 60/029,596, filed Oct. 23, 1996.

BACKGROUND OF THE INVENTION

The subject invention is directed toward the art of timing gears and, more particularly, to a gear arrangement which allows rapid manual adjustment of the relative angular relationship between a timing gear and an associated driving or driven mechanism.

The invention is especially suited for use in internal combustion engines for adjusting engine valve timing by permitting the drive sprocket or gear to be angularly adjusted on the engine camshaft.

High performance internal combustion engines have been provided with different arrangements for allowing manual adjustment of the drive sprocket or gear relative to the camshaft. Certain of these prior arrangements have been difficult to finely adjust or to lock into their adjusted position. Others have been unsatisfactory because of the general complexity or because they weaken the various components involved in the camshaft drive train.

The subject invention provides an adjustable timing gear or sprocket assembly which is relatively simple in construction but which can be quickly adjusted to a desired setting. The assemblies of the invention can be rigidly locked in their adjusted position. In addition, the system proposed by this invention can be added to existing timing gear designs without major redesign of the existing components. That is, relatively minor changes to the major existing components, such as the camshaft and drive sprocket, allow the improved adjustment to be added to the systems.

SUMMARY OF THE INVENTION

In accordance with the subject invention, there is provided an apparatus which includes a shaft having a longitudinal axis and mounted for rotation about the axis. A circular drive member is carried by the shaft and an adjustable key assembly is located between the shaft and the drive member for conducting drive forces therebetween while permitting selective relative angular adjustment. The adjustable key assembly includes a key member having a first end pivotally engaged with one of the shaft and the drive member and a second end slidable engaged with the other of the shaft and drive member. The second end of the key and the other of the shaft and drive member have cooperating inclined surfaces for producing relative angular movement between the shaft and the drive member when the key member is selectively pivoted about the first end.

Preferably, and in accordance with a more limited aspect of the invention, there is a rotary adjustment member that is drivingly engaged with the key member for producing selective pivoting of the key member. In its preferred form, the rotary adjustment member is coaxial with the shaft and means are provided for locking or clamping the rotary adjustment member in selected positions of adjustment.

In one environment, the circular drive member comprises a timing gear of an internal combustion engine and the adjustment allows the relative angular relationships between the timing gear and the associated cam shaft to be selectively changed.

In accordance with a more limited aspect of the invention, the rotary adjustment member includes a contoured cam groove which engages with a portion of the key member that extends into the groove. The contoured groove allows rotation of the adjustment member to produce preselected and controlled pivotal movement of the key member. In its preferred form, the key member is pivotal about an axis that is perpendicular to a plane including the axis of the shaft. In other embodiments, however, it is possible that the key member could be pivotal about axes other than perpendicular to the plane including the axis of the shaft.

A primary object of the invention is the provision of a relatively simple and reliable arrangement for permitting selective angular adjustment between a circular drive member and rotary shaft.

Another object of the invention is the provision of a system for facilitating adjustment of timing gears and sprockets.

A further object of the invention is the provision of a timing gear adjustment which requires no modification to the camshaft and only minor modification to the drive gear or sprocket.

An additional object is the provision of an adjusting assembly wherein the adjusting is accomplished by a simple, tilting key member located between the camshaft and the associated sprocket or drive member.

Still other advantages and benefits of the invention will become apparent to those skilled in the art upon a reading and understanding of the following detailed description.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENT

Figure 1:
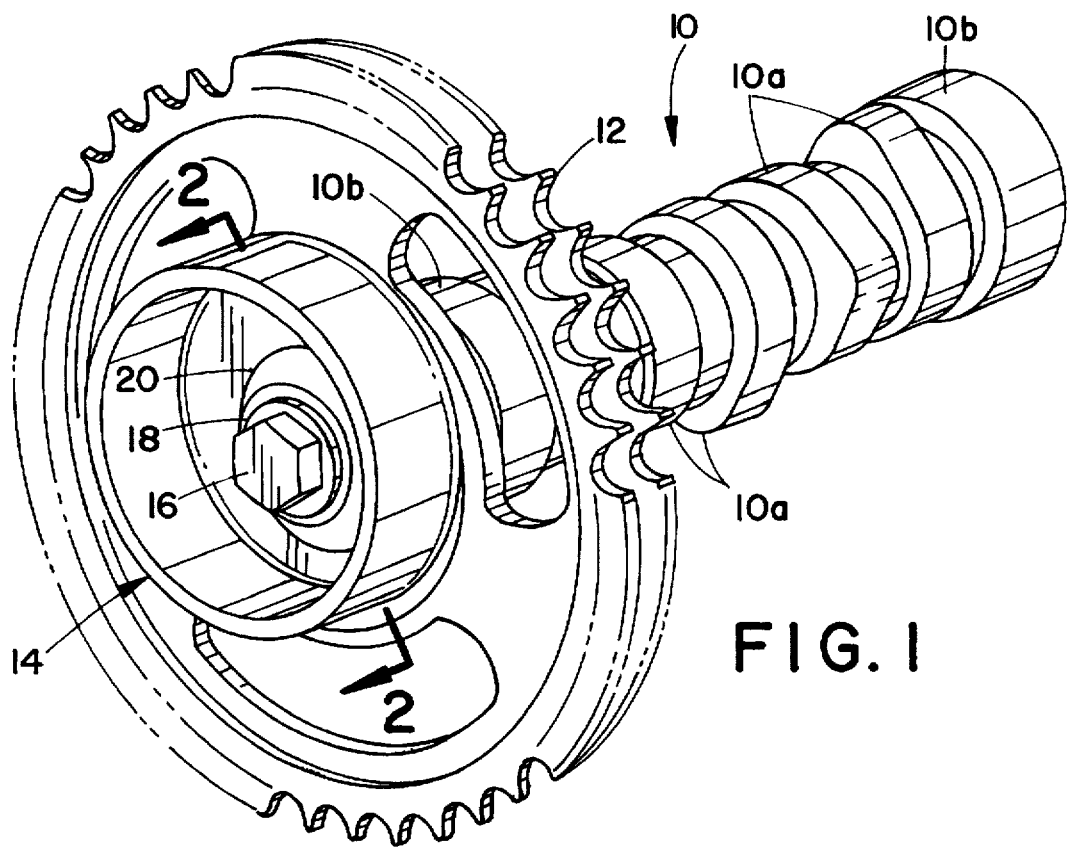
FIG. 1 is an isometric view illustrating a drive sprocket and timing gear assembly of the type to which the subject invention is applicable.

Referring now to the drawings wherein the showings are for the purposes of illustrating the preferred embodiment of the invention only and not for purposes of limiting same, FIG. 1 illustrates the overall arrangement of a typical camshaft 10 to which is adjustably mounted a drive gear 12. The gear 12 is clamped in the desired position of adjustment relative to the camshaft 10 by an eccentric 14 that drives a fuel pump. The eccentric 14 serves as a clamp plate and is held in position on the end of the camshaft 10 and in clamping relationship to the drive gear 12 by a stud bolt 16 that is received in a suitable threaded opening formed in the end of the camshaft 10. The threaded stud bolt 16 carries a standard flat washer 18 and acts against a clamp washer 20. The actual design of the camshaft forms no particular part of the invention and is merely illustrated as a conventional camshaft having integral cam elements 10a formed thereon and supported by suitable cylindrical bearing portions 10b. Likewise, the circular drive member or gear 12 is illustrated as a sprocket, but could equally well be a gear element or the like.

The feature of particular importance to the subject invention is the arrangement whereby the drive member 12 can be angularly adjusted relative to the position of the camshaft throughout a relatively small angular range so that engine valve timing can be changed, such as by being advanced or retarded, as is well known in the internal combustion engine art.

Figure 2:
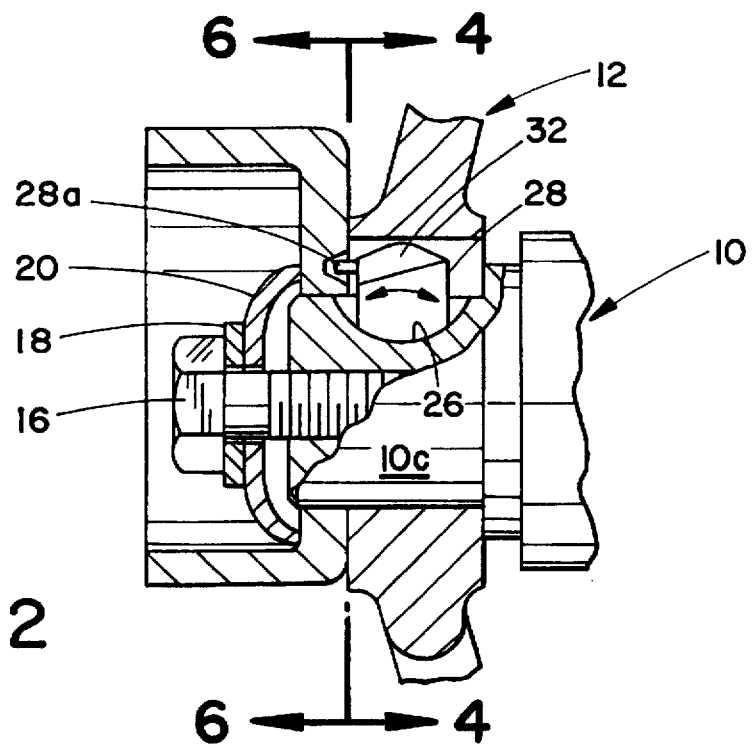
FIG. 2 is a greatly enlarged cross-sectional view taken on line 2—2 of FIG. 1.
Figure 3:
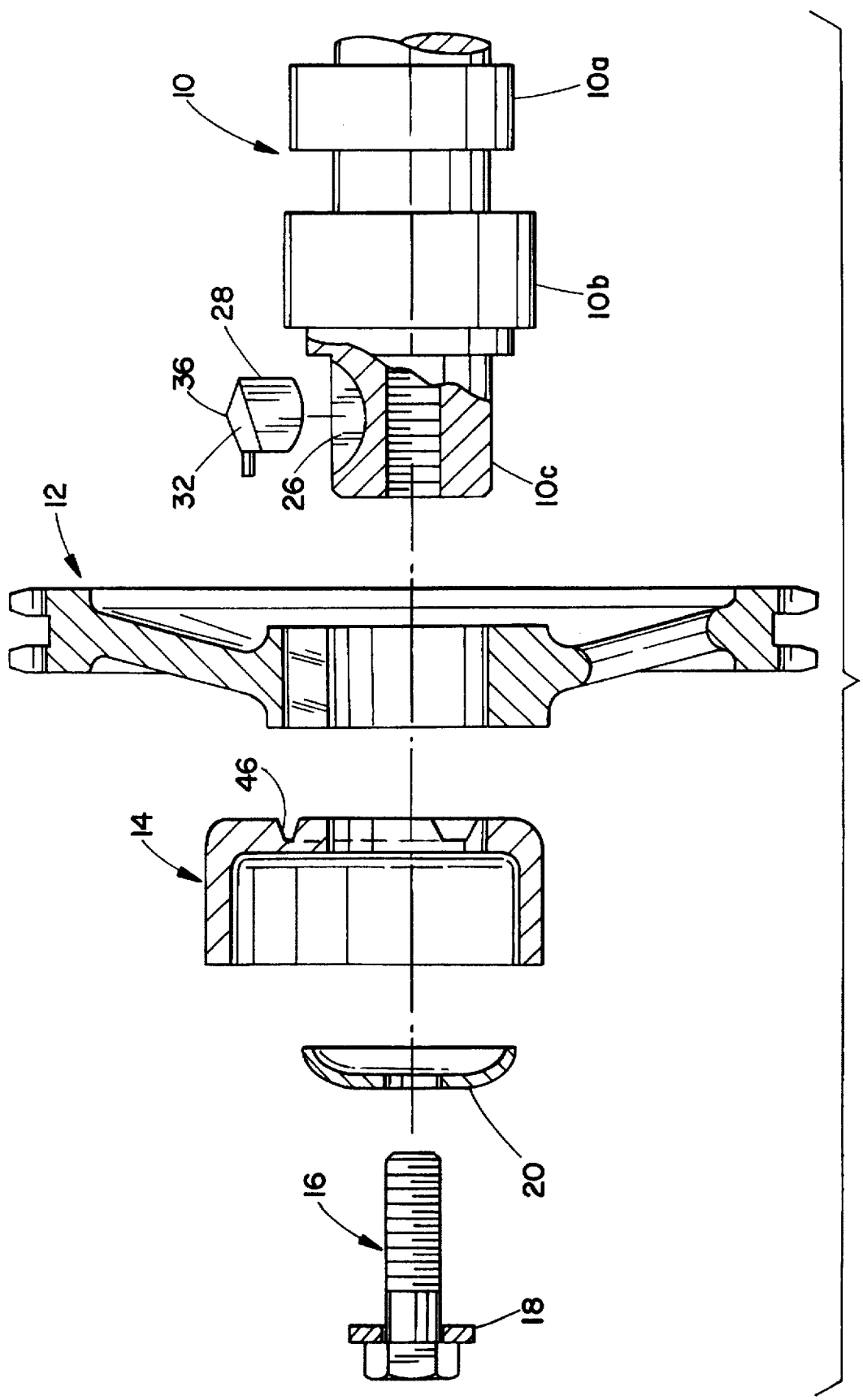
FIG. 3 is an exploded, longitudinal cross-sectional view of a portion of the assembly of FIG. 1.
Figure 4:
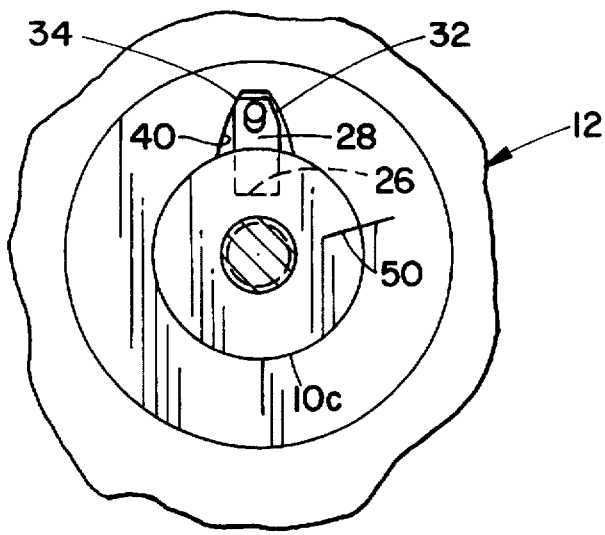
FIG. 4 is a cross-sectional view taken on line 4—4 of FIG. 2.
Figure 5:
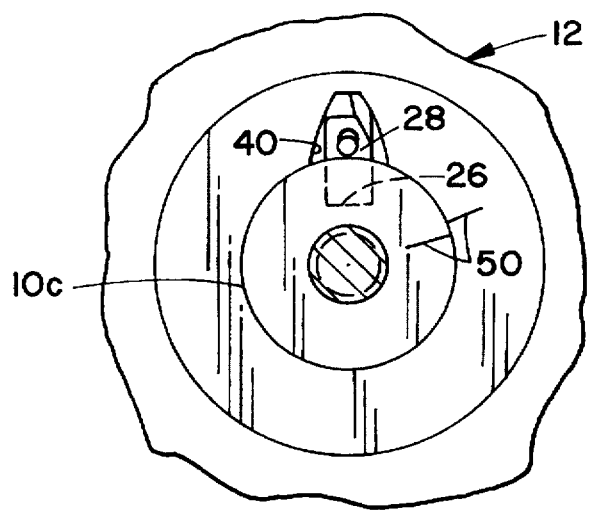
FIG. 5 is a view similar to FIG. 4 but showing the components in a slightly different position of adjustment.
Figure 9:
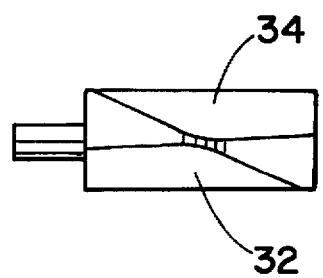
Figure 8:
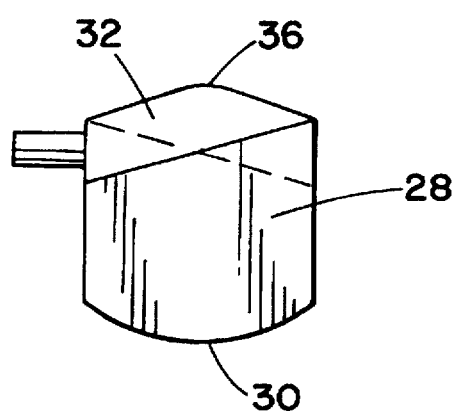
FIG. 8 is a side elevational view of the adjusting key element used in the assembly; and, FIG. 9 is a top view of the adjusting key element shown in FIG. 8.

The particular mechanism proposed by the subject invention for providing the desired adjustment could take many different forms, but is preferably as best illustrated in FIGS. 2-6. In particular, the camshaft end 10c which carries the drive gear 12 is provided with an arcuate key way slot or groove 26 formed generally as seen in FIGS. 2-5. Positioned within this groove is a key member 28 having the configuration best seen in FIGS. 2, 8, and 9. As shown, the key member 28 is arranged for tilting movement in directions generally as shown by the arrows of FIG. 2. To allow the tilting movement, the key member 28 has an arcuate bottom 30 which generally corresponds to the arcuate bottom of the key way 26. The upper end of the key 28 is provided with a pair of asymmetrically inclined or tapered surfaces 32 and 34 that extend upwardly to a slightly rounded upper point 36 which engages the top of the keyway to maintain the bottom surface 30 of the key in contact with the slot in the shaft. The surfaces 32 and 34 are arranged for engagement with the sides of an inverted V-shaped recess 40 that extends through the center of the drive sprocket or gear 12. Note that the opening 40 has a contour suitably shaped so as to provide a controlled amount of angular lash or play throughout the range of adjustment. Thus, as the key 28 is tilted within the key way 26, an arcuate driving force is applied to the sprocket 12. This, of course, shifts the sprocket relative to the camshaft 10 at least throughout a relatively small, arcuate range. This can best be seen in FIG. 4 wherein the components are in the FIG. 2 relationship. However, if the key member 28 is tilted to the left as viewed in FIG. 2 to the position generally illustrated in FIG. 5, arcuate movement is required between the drive sprocket 12 and the camshaft 10. The reason for this is that the cooperative engagement between the key member surfaces 32, 34 and the corresponding sides of the V-groove 40 require that such arcuate relative movement take place.

Figure 6:
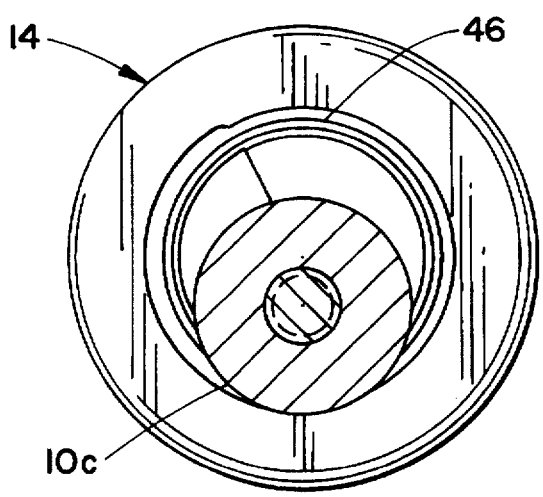
FIG. 6 is a view taken on line 6—6 of FIG. 2.
Figure 7:
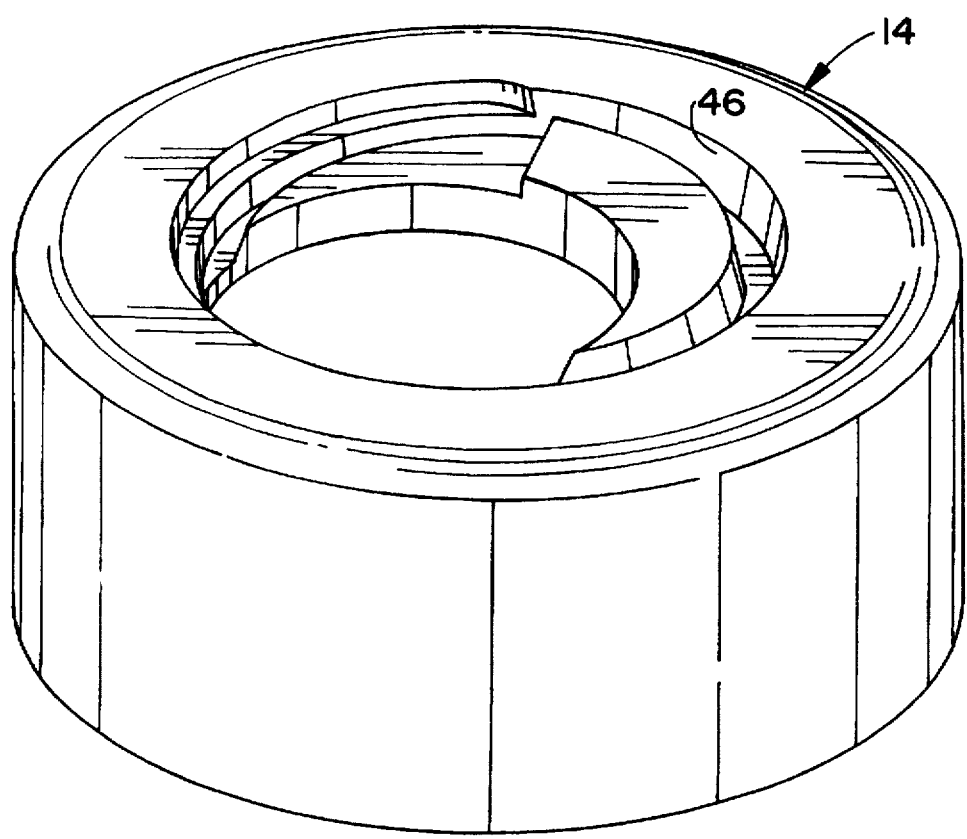
FIG. 7 is an isometric view of one component of the assembly showing the adjusting groove formed therein.

Means are provided for producing gradual tilting movement and shifting of the key 28. This means could take many forms but, in the subject, preferred embodiment, it includes a suitable V-groove formed in the end surface of the eccentric 14 and as best seen in FIGS. 2, 6, and 7. In particular, as illustrated, the eccentric 14 has a V-shaped, flat bottomed groove 46 formed therein and eccentrically located relative to the opening through which the end of camshaft be is received. A lever-like actuator in the form of a hardened pin member 28a extends from the key member 28 into engagement with the sidewalls of the groove 46. The pin member 28a can be formed integral with the key or added as a separate member. Thus, rotation of the eccentric relative to the drive gear 12 and the camshaft 10 forces the key member 28 to be tilted as can readily be seen. Consequently, to produce a fine adjustment of the angular relationships between the camshaft be and the drive sprocket 12, it is necessary merely to release or loosen the stud bolt 16 and twist or rotate the eccentric 14 slightly relative to the sprocket 12. This, of course, causes the required tilting of the key 28 to produce the angular adjustment as desired. Suitable match lines or other indicia can be placed on the end of the camshaft and the face of the drive sprocket 12 as illustrated at 50 in FIGS. 4 and 5. A plurality of such match lines or indicia lines can be provided to illustrate the actual number of degrees of change produced by the rotation.

It should be appreciated that the relationships between the key member 28 and the other components could be changed from that shown. In certain instances, the key could be positively mounted in position for movement about a pin or other axis defining element.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. Apparatus comprising:
   a shaft having a longitudinal axis and mounted for rotation about said axis;
   a circular drive member carried by said shaft; and,
   an adjustable key assembly between said shaft and said drive member for conducting drive forces therebetween while permitting selective relative angular adjustment, said adjustable key assembly including a key member having a first end pivotally engaged with one of said shaft and said drive member and a second end slidably engaged with said other of said shaft and said drive member, said second end of said key and said other of said shaft and said drive member having cooperating inclined surfaces for producing relative angular movement between said shaft and said drive member when said key member is selectively pivoted about said first end.

2. The apparatus as defined in claim 1 including a rotary adjustment member drivingly engaged with said key member for producing selective pivoting of said key member.

3. The apparatus as defined in claim 2 wherein the rotary adjustment member is coaxial with said shaft.

4. The apparatus as defined in claim 2 wherein said rotary adjustment member includes a contoured cam groove and said key member includes a portion extending into said groove.

5. The apparatus as defined in claim 1 wherein said key member is pivotal about an axis perpendicular to a plane including the axis of said shaft.

6. The apparatus as defined in claim 1 wherein said key member has its first end pivotally engaged with said shaft.

7. The apparatus as defined in claim 6 wherein said first end of said key member is convex and said shaft includes a concave recess which receives said first end of said key member.

8. The apparatus as defined in claim 1 including an adjustment member drivingly engaged with said key member.

9. The apparatus as defined in claim 8 wherein said adjustment member is manually movable to selected positions of adjustment and means are provided for selectively clamping said adjustment member in said selective positions.

10. The apparatus as defined in claim 8 wherein said adjustment member is mounted for rotation about said axis and includes a contoured groove engaged with said key member.

11. The apparatus as defined in claim 10 wherein said contoured groove is located in a plane perpendicular to said axis.

12. The apparatus as defined in claim 10 wherein said key member includes a pin extending into said contoured groove.

13. The apparatus as defined in claim 10 wherein means are provided for clamping said adjustment member in selected positions of adjustment.

14. Apparatus comprising:
   a shaft having a longitudinal axis, said shaft mounted for rotation about said longitudinal axis;
   a circular drive member carried by said shaft; and,
   an adjustment assembly between said shaft and said drive member for conducting drive forces therebetween while permitting selective relative angular adjustment between said drive member and said shaft, said adjustment assembly including:
   a key member extending between said shaft and said drive member, said key member mounted for pivotal movement;
   an adjustment member for selectively pivoting said key member; and,
   cooperating inclined surfaces carried by said key member and one of said shaft and said circular drive member for producing relative angular movement between said shaft and said circular drive member upon pivotal movement of said key member.

15. The apparatus as defined in claim 14 wherein said adjustment member is drivingly engaged with said key member by a pin extending between said adjustment member and said key member.

16. The apparatus as defined in claim 14 including means for connecting said adjustment member in selected positions of adjustment.

* * * * *